United States Patent Office 3,300,528
Patented Jan. 24, 1967

3,300,528
VAPOR PHASE PROCESS FOR PREPARING VINYL ACETATE BY THE OXIDATION OF ETHYLENE WITH A GROUP VIII NOBLE METAL PLUS COPPER OR IRON
Ryoichi Wakasa, Naoya Kominami, and Kanji Ishii, Tokyo, Japan, assignors to Asahi Kasei Kogyo Kabushiki Kaisha, Osaka, Japan, a corporation of Japan
No Drawing. Filed Oct. 9, 1963, Ser. No. 314,872
Claims priority, application Japan, Oct. 11, 1962, 37/43,780; Oct. 15, 1962, 37/44,690; Nov. 12, 1962, 37/49,705; Nov. 27, 1962, 37/52,039; Feb. 6, 1963, 38/4,724, 38/4,725
2 Claims. (Cl. 260—497)

This invention relates to an economical process of producing vinyl esters of fatty acids from ethylene and fatty acids. More particularly, this invention relates to a process of producing vinyl acetate from ethylene and acetic acid.

Heretofore, vinyl esters of fatty acids such as vinyl acetate have been prepared commercially from acetylene and fatty acids. However, a large quantity of ethylene is available cheaply as a result of recent developments in the petroleum chemical industry.

It is an object of this invention to provide vinyl esters of fatty acids by an economically advantageous and commerically feasible process comprising causing a reaction between ethylene and fatty acids in flowing gaseous phase in the presence of a suitable catalyst.

Although I. I. Moiseef obtained vinyl acetate by the reaction between ethylene and sodium acetate palladium chloride in solvent [I. I. Moiseef, Proc. Acad. Sci. USSR, 133, 377 (1960)], this process is not economically advantageous, because 1 mole, or more, of expensive palladium chloride is required for producing 1 mole of vinyl acetate. Moiseef has further developed the process of producing vinyl acetate employing a catalytic amount of palladium chloride, but, this process is also expensive because 2 mols or more of rather costly benzoquinone are required for producing one mole of vinyl acetate.

Now, we have discovered that the above mentioned object of this invention may be achieved by a process characterized in that a gaseous mixture consisting of ethylene, a saturated fatty acid having less than 8 carbon atoms and oxygen or an oxygen containing gas are caused to react in flowing gaseous phase in the presence of the catalyst as will be defined hereinafter.

The said catalyst consists of at least one member selected from the group consisting of palladium, platinum, rhodium, ruthenium and iridium metals and the combination thereof together with at least one member selected from the group consisting of copper, silver, zinc, cadmium, tin, lead, chromium, molybdenum, tungsten, iron, cobalt and nickel metals and lower valent metal oxides thereof, each member being supported on a suitable carrier.

Among the two groups at least one member selected from the first group consisting of palladium, platinum, rhodium, ruthenium and iridium metals is sufficient for producing vinyl esters of fatty acids even without co-use of the member of the second group. Thus, these metals of the first group constitute a main catalyst of this invention. On the other hand, at least one member selected from the second group consisting of copper, silver, zinc, cadmium, tin, lead, chromium, molybdenum, tungsten, iron, cobalt and nickel metals and lower valent metal oxides thereof, though impossible to produce vinyl esters of fatty acids by themselves, can significantly increase the conversion of ethylene when employed as a promotor.

The function of the above mentioned catalysts essential for the process of this invention becomes evident when the catalysts consisting of the above mentioned main catalyst alone or together with the said promotor on a suitable carrier are used in the gaseous phase reaction of this invention. On the other hand, as will be shown hereinafter, salts of the above mentioned metals, for example, palladium chloride and cupric chloride supported on a suitable carrier yield no appreciable amount of vinyl esters of fatty acids in the flowing gaseous phase reaction according to this invention even after a prolonged period of continued reaction up to several hours.

Thus, the object of this invention may be realized only when the catalysts constituted of the main catalysts, alone or in combination with the promotors, carried on a suitable carrier are used in the reaction.

Furthermore, the gaseous phase reaction between ethylene and fatty acid and oxygen or a molecular oxygen containing gas in the presence of the above defined catalyst also yields acetaldehyde, a commercially useful raw material, as a by-product.

More strictly, the present invention includes a process for producing vinyl esters of fatty acids and acetaldehyde in commercially feasible yields by the flowing gaseous phase reaction between ethylene, a suitable fatty acid and oxygen or a molecular oxygen gas in the presence of the above defined catalysts.

The fatty acids employed in the process of this invention are saturated acids having less than 8 carbon atoms. The reaction temperature is in the range between 50° and 300° C., preferably between 80° and 200° C., and most preferably between 85° and 117° C.

At temperatures higher than the above specified range, side-reactions become predominant, thus decreasing selective formation of vinyl esters of fatty acids and increasing the formation of by-products such as carbon dioxide, ethane, methane, carbon monoxide and ketone; the process at temperatures below the above specified range are also unfavorable owing to slower reaction rate and excessively lower vapour pressure of fatty acids.

The starting material, ethylene, may contain a small amount of lower aliphatic saturated hydrocarbons such as methane, ethane, propane. A small amount of impurities such as acetaldehyde and water are also tolerable in the fatty acids used as the starting material. However, the water content in the starting materials should be as low as possible, because the presence of water favors the formation of acetaldehyde and reduces the yield of vinyl esters of fatty acids.

Oxygen, pure or mixed with a diluent such as nitrogen and carbon dioxide, or air may be employed as a molecular oxygen containing gas.

The catalysts employed in the process of this invention may be obtained by causing at least one member selected from the group consisting of palladium chloride, chloroplatinic acid, rhodium chloride, ruthenium chloride and iridium chloride and at least one member selected from the group consisting of ammonium chromate, ammonium molybdate, ammonium tungstate, nitrates of copper, silver, zinc, cadmium, tin, lead, iron, cobalt and nickel to settle simultaneously or successively on a carrier followed by either calcining in air for converting the components-on-carrier into oxide or by treating with ammonium hydroxide or sodium hydroxide when nitrate is used and finally reducing them with hydrogen at appropriate temperatures. Alternatively, metal chlorides or oxides in the main catalysts and/or promotors previously settled on a carrier by a precipitation and/or calcination method may be reduced with hydrogen or other reducing agents such as hydrazine, formaline and hydroquinone. Although activated carbon or silica is favorable as a carrier of the catalysts, any other conventional carrier may be employed without inconvenience. For example, at least one member selected from the group consisting of natural or artificial silica, alumina, magnesia, silicon-carbide may be employed.

The reaction pressure may be either atmospheric or superatmospheric in so far as starting materials and reaction products exist in gaseous state in the course of reaction. In the reaction vessels, either a fixed bed or fluidized bed catalyst system may be employed.

According to the process of this invention, vinyl esters of fatty acids particularly vinyl acetate may be produced in a continuous process from a flowing gaseous mixture of fatty acid, particularly acetic acid, ethylene and oxygen or a molecular oxygen containing gas in an industrially feasible and economic scale.

Example 1

A solution containing 16.8 g. of anhydrous palladium chloride and 17 g. of cupric chloride ($CuCl_2 \cdot 2H_2O$) in 200 ml. of 5% aqueous hydrochloric acid was mixed with 100 g. of granular activated carbon and the resulting suspension was evaporated, and dried to produce a composite substance consisting of palladium chloride of cupric chloride settled on granular activated carbon.

Into a reaction tube of Pyrex glass (inner diameter 2.6 cm.) were packed 18.9 g. (apparent volume 40 ml.) of the above prepared catalyst and reduced with hydrogen (flowing velocity 200 ml./min.) for 15 hours at a temperature of 150° C.

Thereafter, a gaseous mixture containing ethylene, acetic acid and oxygen in a molar ratio of 65:25:10 was passed through the reaction tube maintained at 100° C. at a space velocity of 110 l./l. catalyst/hr. Conversion of ethylene was 11.5% and the yields of vinyl acetate and acetaldehyde based on the consumed ethylene were 73% and 22% respectively.

In another experiment, a catalyst prepared according to the same method as above but without cupric chloride was used under the same reaction conditions. Conversion of ethylene was 4.6% and yields of vinyl acetate and acetaldehyde were 93% and traces respectively.

Example 2

A composite catalyst consisting of 4 g. of chloroplatinic acid ($H_2PtCl_6 \cdot 6H_2O$) in place of palladium chloride in Example 1 and 2.5 g. of cupric chloride ($CuCl_2 \cdot 2H_2O$) carried on 14 g. of granular activated carbon was prepared with the same method as above. After reduction it was employed in the same reaction conditions as in Example 1. The resulting conversion of ethylene was 13.1%, with the yields of vinyl acetate and acetaldehyde being 69% and 24% respectively.

Comparative Example 1

A platinum catalyst was prepared with the same procedure as in Example 2 but without using cupric chloride and used in the same reaction. The result was 6.2% conversion of ethylene, 94% yield of vinyl acetate and a trace of acetaldehyde.

Comparative Example 2

A copper catalyst was prepared in the same manner as in Example 2 except that chloroplatinic acid was omitted from the catalyst and the catalyst was used in the same manner as in Example 2. The result was a lower conversion of ethylene and formation of a small amount of carbon dioxide and no appreciable amount of vinyl acetate and acetaldehyde.

Example 3

5 g. of iridium tetrachloride ($IrCl_4$) and 2.5 g. of cupric chloride ($CuCl_2 \cdot 2H_2O$) supported on 17 g. of commercially available granular activated alumina were added to 40 ml. of 37% aqueous formaldehyde, cooled to 0°–5° C., treated with 20 ml. of 40% aqueous sodium hydroxide at 80° C. for settling the metals on alumina. The resulting composite catalyst consisting of iridium and copper was settled on activated alumina was washed with water, dried in nitrogen atmosphere and packed into a reaction tube under nitrogen atmosphere. Then, a gaseous mixture containing ethylene, acetic acid and oxygen in a molar ratio of 65:25:10 was passed through the reaction tube at a space velocity of 110 l./l. catalyst/hr. and at a reaction temperature kept at 100° C. Vinyl acetate and acetaldehyde were obtained in yields of 66% and 21% respectively based on the amount of consumed ethylene which corresponded to 14% of the initially introduced amount.

Example 4

A mixture consisting of 1.7 g. of anhydrous palladium chloride, 20 g. of ferric nitrate [$Fe(NO_3)_3 \cdot 9H_2O$] and 14 g. of granular activated carbon was added to 40 ml. of 10% aqueous sodium hydroxide, warmed to 80° C., washed with water and dried. The catalyst thus prepared was packed into a reaction tube and was reduced with hydrogen at a flow rate 300 ml./min. and at a temperature of 400° C. Then, a gaseous mixture consisting of ethylene, acetic acid and oxygen in a molar ratio of 65:25:10 was passed through the reaction tube at a space velocity of 130 l./l. catalyst/hr. From the consumed ethylene corresponding to 5.4% of the initial amount, vinyl acetate and acetaldehyde were obtained in yields of 65% and 27% respectively.

Comparative example

An iron catalyst was prepared in the same manner as in Example 4, except that palladium chloride was omitted from the catalyst, and used in reaction in the same manner. The result was a slight conversion of ethylene and formation of a slight amount of carbon dioxide and no detectable vinyl acetate and acetaldehyde.

Example 5

A catalyst consisting of 3.7 g. of chloroplatinic acid ($H_2PtCl_6 \cdot 6H_2O$) and 11 g. of cobalt nitrate $$[Co(NO_3)_2 \cdot 6H_2O]$$

carried on 24 g. of granular activated alumina was prepared with the same manner as in Example 4 and employed in the same reaction. Conversion of ethylene was 6.5% and the yields of vinyl acetate and acetaldehyde from the converted ethylene were 70% and 24% respectively.

Example 6

A catalyst was prepared by adding 2 g. of rhodium trichloride ($RhCl_3 \cdot 4H_2O$), 11 g. of zinc nitrate $$[Zn(NO_3)_2 \cdot 6H_2O]$$

and 14 g. of granular activated carbon to 50 ml. of 4% aqueous ammonia, heating the resulting suspension to expel excess ammonia, washing with water and drying. The catalyst was packed in a reaction tube and reduced with hydrogen flowing at a rate of 300 ml./min. at 220° C. for 6 hours. Thereafter, a gaseous mixture containing ethylene, acetic acid and air in a molar ratio of 25:25:50 was introduced at a space velocity of 540 l./l. catalyst/hr. and at a reaction temperature of 100° C. Conversion of ethylene was 2.3% and the yields of vinyl acetate and acetaldehyde against consumed ethylene were 55% and 21% respectively.

In another reaction under the same condition as above using a rhodium catalyst prepared as above but without using zinc nitrate, 0.8% of ethylene conversion and 73% yield of vinyl acetate were obtained.

In still another reaction under the same condition as above using a catalyst prepared from 11 g. of cadmium nitrate [$Cd(NO_3)_2 \cdot 4H_2O$] substituted for zinc nitrate in the just preceding run, the result was 1.7% conversion of ethylene and 57% and 18% yields of vinyl acetate and acetaldehyde based on the consumed ethylene.

Example 7

A catalyst prepared by calcining 3.7 g. of chloroplatinic acid ($H_2PtCl_6 \cdot 6H_2O$) and 12 g. of ammonium molybdate [$3(NH_4)_2O \cdot 7MoO_3 \cdot 4H_2O$] carried on 24 g. of granular activated alumina at 500° C. for 4 hours was packed into a reaction tube and reduced with hydrogen at 400° C. for 4 hours. Then, the reaction tube was maintained at 180° C. and a gaseous mixture of ethylene, acetic acid and oxygen in a molar ratio of 65:25:10 was passed through the reaction tube at a space velocity of 130 l./l. catalyst/hr.

Conversion of ethylene was 7.2% and the yields of vinyl acetate and acetaldehyde were 54% and 21% respectively based on the consumed ethylene.

In another run, a catalyst was prepared in the same manner as above using 16 g. of ammonium tungstate [$3(NH_4)_2O \cdot 7WO_3 \cdot 6H_2O$] in place of ammonium molybdate and employed in the same reaction with the result of 7.2% conversion of ethylene and yields of vinyl acetate and acetaldehyde being 53% and 20% respectively.

Example 8

A catalyst was prepared by calcining 1.5 g. of ruthenium trichloride ($RuCl_3$) and 15 g. of ammonium bichromate [$(NH_4)_2Cr_2O_7$] on 24 g. of granular silica gel at 420° C. for an hour in air, packed into a reaction tube and reduced with hydrogen 4 hours at 400° C. for 4 hours. A gaseous mixture of ethylene, acetic acid and oxygen in a molar ratio of 55:35:10 was passed through the reaction tube at a space velocity of 130 l./l. catalyst/hr. at a reaction temperature of 120° C. The resulting conversion of ethylene was 4.2% and the yields of vinyl acetate and acetaldehyde were 58% and 19% respectively.

Example 9

Granular silica gel (24 g.) was immersed in each of the following metal salt solution. Then, the metal salts adsorbed onto silica gel were converted into hydroxide with aqueous sodium hydroxide and reduced with hydrogen.

A gaseous mixture containing ethylene, acetic acid and oxygen in a molar ratio of 65:25:10 was passed over the catalyst at a space velocity of 130 l./l. catalyst/hr. and at a temperature of 120° C. The obtained conversion of ethylene and the yields of vinyl acetate and acetaldehyde based on the consumed ethylene were as follows:

| Added metal salts | Conversion of Ethylene (Percent) | Yields of Vinyl Acetate (Percent) | Yields of Acetaldehyde (Percent) |
| --- | --- | --- | --- |
| $RuCl_3$, 1.5 g. $AgNO_3$, 10.2 g. | 4.5 | 59 | 25 |
| $IrCl_4$, 2.1 g. $Pb(NO_3)_2$, 20 g. | 3.8 | 51 | 22 |
| $PdCl_2$, 2 g. $SnCl_2 2H_2O$, 13.5 g. | 4.2 | 53 | 24 |

Example 10

A composite catalyst consisting of 1.2 g. of anhydrous palladium chloride and 12 g. of cupric chloride ($CuCl \cdot 2H_2O$) and 14 g. of granular activated carbon was packed in a reaction tube and reduced at 180° C.

A gaseous mixture of ethylene, propionic acid and oxygen in a molar ratio of 65:25:10 was passed through the reaction tube maintained at a temperature of 100° C. The gaseous effluent from the tube was introduced into a trap and the resulting liquid product was rectified to yield a main product with a boiling point of 34° C./70 mm. Hg. The identity with an authentic sample of vinyl propionate was established on the infrared spectra identical each other. Conversion of ethylene was 8.3% and the yields of vinyl propionate and acetaldehyde were 75% and 18% respectively.

Example 11

A mixture consisting of 4.1 g. of chloroplatinic acid ($H_2PtCl_6 \cdot 6H_2O$), 30 g. of ferric nitrate $$[Fe(NO_3)_3 \cdot 9H_2O]$$

and 15 g. of grannular activated carbon was treated with 250 ml. of 5% aqueous sodium hydroxide at 80° C., washed well with water and finally dried. The resulting catalyst was packed in a reaction tube and reduced with hydrogen at 400° C. Then, a gaseous mixture containing ethylene, formic acid and air in a ratio of 25:25:50 was passed through the reaction tube at a space velocity of 300 l./l. catalyst/hr. and at a reaction temperature of 100° C. The resulting conversion of ethylene was 4.5% and the yields of vinyl formate and acetaldehyde were 65% and 20% respectively.

Example 12

A mixture of 1.5 g. of ruthenium trichloride [$RuCl_3$], 22.3 g. of zinc nitrate [$Zn(NO_3)_2 \cdot 6H_2O$], and 15 g. of granular activated carbon was treated with 80 ml. of 5% aqueous ammonia, warmed to expel an excess ammonia, washed well with water and dried. The catalyst thus obtained was packed into a reaction tube and reduced with hydrogen at 220° C. A gaseous mixture of ethylene, n-caprylic acid and oxygen in a molar ratio of 80:10:10 was introduced at a space velocity of 200 l./l. catalyst/hr. and caused to react at a temperature of 200° C. As a result, 6.2% conversion of ethylene and 65% and 16% yields of vinyl caprylate and acetaldehyde respectively were obtained.

What we claim is:

1. A process which comprises passing a gaseous mixture of acetic acid, ethylene and a molecular oxygen containing gas in a reaction zone over a catalyst consisting of at least one member selected from the group consisting of palladium, platinum, rhodium, ruthenium and iridium, together with copper.

2. A process which comprises passing a gaseous mixture of acetic acid, ethylene and a molecular oxygen containing gas in a reaction zone over a catalyst consisting of at least one member selected from the group consisting of palladium, platinum, rhodium, ruthenium and iridium, together with iron.

References Cited by the Examiner

UNITED STATES PATENTS 3,076,032  1/1963  Riemenschneider ____ 260—597
3,190,912  6/1965  Robinson _____ 260—497

FOREIGN PATENTS 625,430  8/1961  Canada.
137,511  4/1960  U.S.S.R.

OTHER REFERENCES

Moiseef: Doklady Akademii Nauk SSSR vol. 133, pages 377–380, (1960).

LORRAINE A. WEINBERGER, *Primary Examiner.*

LEON ZITVER, *Examiner.*

D. P. CLARKE, V. GARNER, *Assistant Examiners.*